(12) United States Patent
Viswanath et al.

(10) Patent No.: US 6,954,427 B1
(45) Date of Patent: Oct. 11, 2005

(54) METHOD AND APPARATUS FOR PERFORMING PRIORITY-BASED ADMISSION CONTROL

(75) Inventors: Somnath Viswanath, San Jose, CA (US); Gopal S. Krishna, San Jose, CA (US); Peter Ka-Fai Chow, San Jose, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 843 days.

(21) Appl. No.: 09/818,621

(22) Filed: Mar. 28, 2001

(51) Int. Cl.⁷ .............................................. H04L 12/26
(52) U.S. Cl. ................. 370/230; 370/395.42; 709/207
(58) Field of Search ................................ 370/229, 230, 370/230.1, 231, 235, 236, 389–390, 395.42, 370/395.53, 401, 412–418, 422–423, 428–429, 370/463; 709/200–202, 207, 217; 710/56–57, 710/52

(56) References Cited

U.S. PATENT DOCUMENTS

| | | | |
|---|---|---|---|
| 5,696,764 A | 12/1997 | Soumiya et al. | 370/395.41 |
| 5,822,540 A | 10/1998 | Caldara et al. | 395/200.66 |
| 5,828,653 A * | 10/1998 | Goss | 370/230 |
| 5,850,399 A * | 12/1998 | Ganmukhi et al. | 370/412 |
| 5,936,958 A | 8/1999 | Soumiya et al. | 370/395.43 |
| 5,938,749 A | 8/1999 | Rusu et al. | |
| 5,953,335 A * | 9/1999 | Erimli et al. | 370/390 |
| 6,084,856 A | 7/2000 | Simmons et al. | 370/235 |
| 6,094,435 A | 7/2000 | Hoffman et al. | 370/414 |
| 6,134,218 A | 10/2000 | Holden | |
| 6,141,323 A | 10/2000 | Rusu et al. | |
| 6,377,548 B1 | 4/2002 | Chuah | 370/233 |
| 6,385,638 B1 | 5/2002 | Baker-Harvey | |
| 6,647,424 B1 | 11/2003 | Pearson et al. | 709/232 |
| 6,665,872 B1 | 12/2003 | Krishnamurthy et al. | |
| 6,667,985 B1 | 12/2003 | Drummond-Murray | 370/415 |
| 6,754,241 B1 | 6/2004 | Krishnamurthy et al. | |
| 6,760,774 B1 | 7/2004 | Soumiya et al. | |
| 6,788,697 B1 | 9/2004 | Aweya et al. | 370/412 |
| 6,798,743 B1 * | 9/2004 | Ma et al. | 370/235 |
| 6,801,501 B1 | 10/2004 | Knightly et al. | |
| 6,822,940 B1 | 11/2004 | Zavalkovsky et al. | 370/237 |
| 2001/0007561 A1 | 7/2001 | Aznar et al. | 370/409 |
| 2002/0107908 A1 | 8/2002 | Dharanikota | |
| 2002/0110134 A1 | 8/2002 | Gracon et al. | 370/412 |

OTHER PUBLICATIONS

U.S. Appl. No. 09/797,688, filed Mar. 5, 2001.
U.S. Appl. No. 09/814,816, filed Mar. 23, 2001.

* cited by examiner

Primary Examiner—Wellington Chin
Assistant Examiner—John Shew
(74) Attorney, Agent, or Firm—Harrity & Snyder, LLP (57) ABSTRACT

A network device that controls the communication of data frames between stations includes a memory that stores frame pointers that point to addresses in an external memory. The data frames are stored in the external memory while the network device generates frame forwarding information for the respective data frames. The network device divides the available frame pointers into a number of categories corresponding to priorities associated with the data frames. When a frame is received at the network device, frame processing logic determines the priority of the data frame and checks whether a frame pointer corresponding to that particular priority is available. If no frame pointer corresponding to that priority is available, the multiport switch drops the data frame.

19 Claims, 4 Drawing Sheets

METHOD AND APPARATUS FOR PERFORMING PRIORITY-BASED ADMISSION CONTROL

CROSS-REFERENCE TO RELATED APPLICATIONS

This application is related to the following commonly-assigned, copending applications: U.S. Ser. No. 09/797,688 entitled METHOD AND APPARATUS FOR REDUCING CONGESTION ON A NETWORK DEVICE and U.S. Ser. No. 09/814,816 entitled ADMISSION CONTROL IN A NETWORK DEVICE.

TECHNICAL FIELD

The present invention relates generally to network communications and, more particularly, to performing admission control on a network device.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of data and includes logic for receiving and forwarding data frames to their appropriate destinations.

When all of the stations connected to the network are simultaneously operating and transmitting data at high speeds, data traffic on the switch may become heavy. Accordingly, some switches may drop received data frames when a congestion condition occurs. That is, the switch may stop processing or discard a data frame when one or more resources on the switch associated with processing the data frame cannot perform their intended functions. In this case, the data frame is not forwarded to its intended destination. A drawback with dropping data frames based on a congestion condition is that data throughput is reduced and the end user's satisfaction associated with the network switch is often lowered.

DISCLOSURE OF THE INVENTION

There exists a need for a mechanism for selectively dropping data frames received by a network device based on the priority associated with the data frame.

This and other needs are met by the present invention, where a multiport device receives a data frame and identifies a priority associated with the data frame. The multiport device then determines whether to perform an admission control procedure based on the priority. For example, when the priority of the data frame is "low," the data frame may be dropped, but when the priority is "high," the data frame may be processed and forwarded to its intended destination.

According to one aspect of the present invention, a network device that controls communication of data frames between stations is provided. The network device includes a plurality of receive ports configured to receive data frames from the stations. The network device also includes data frame processing logic configured to determine a priority associated with a received data frame and determine whether a location in an external memory is available for storing the data frame, based on the priority of the received data frame.

Another aspect of the present invention provides a method in a network device that controls communication of data frames between stations. The method includes receiving data frames from the stations and determining a priority associated with a received data frame. The method also includes determining, based on the priority of the received data frame, whether a location in an external memory is available for storing the data frame.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
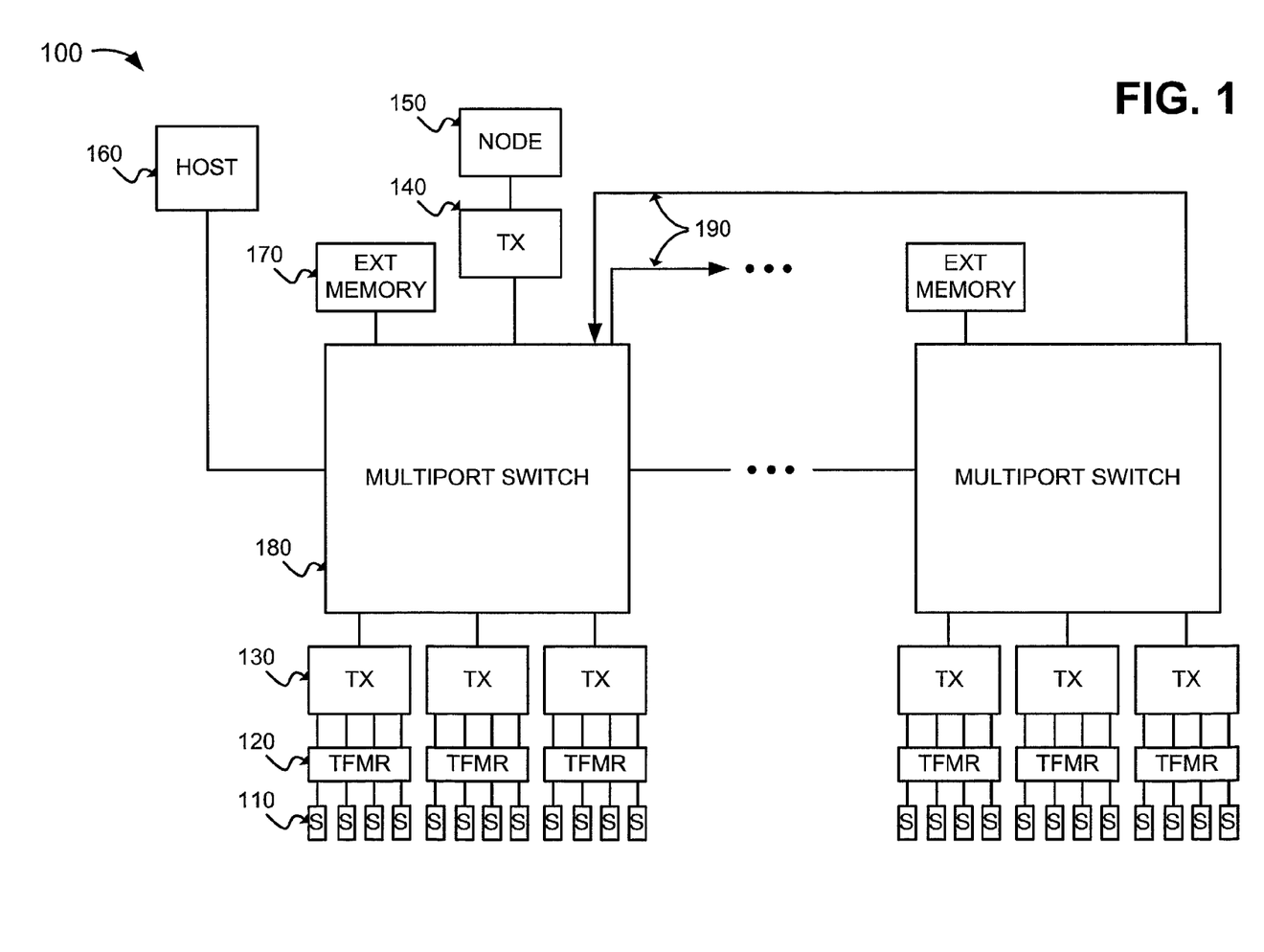
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
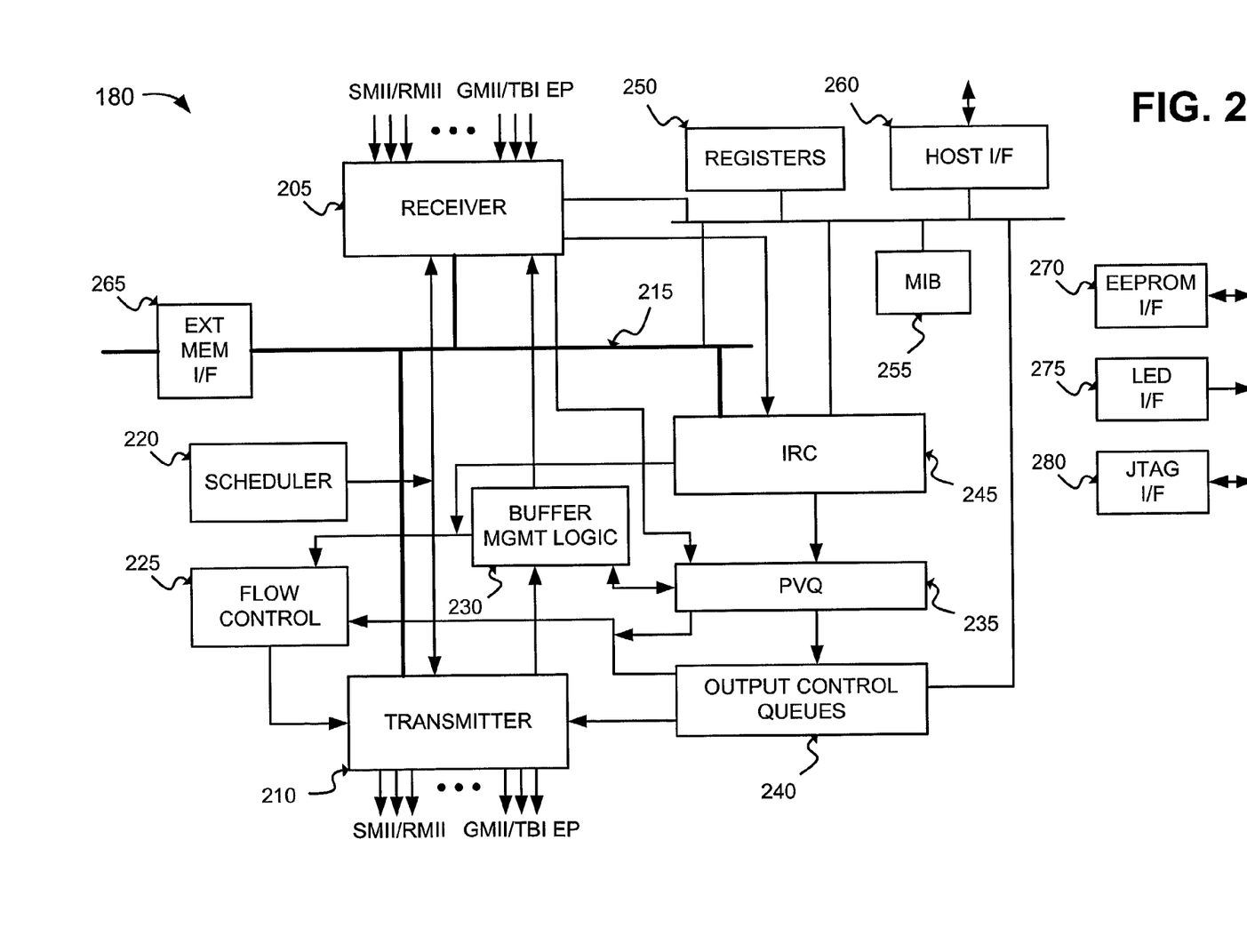
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Priority-Based Admission Control

The present invention is directed to a priority-based admission control mechanism in a network device, such as multiport switch 180. The multiport switch 180, consistent with the present invention, divides the available frame pointers into a number of categories corresponding to various priorities. When the multiport switch 180 receives a data frame associated with a particular priority, the multiport switch 180 checks whether a frame pointer corresponding to that particular priority is available. If no frame pointer corresponding to that priority is available, the multiport switch 180 may drop the data frame. When a data frame having a different priority is received, the multiport switch 180 checks whether a frame pointer corresponding to the different priority is available. In this manner, the number of received frames having one priority will not affect the processing of frames having other priorities.

Figure 3:
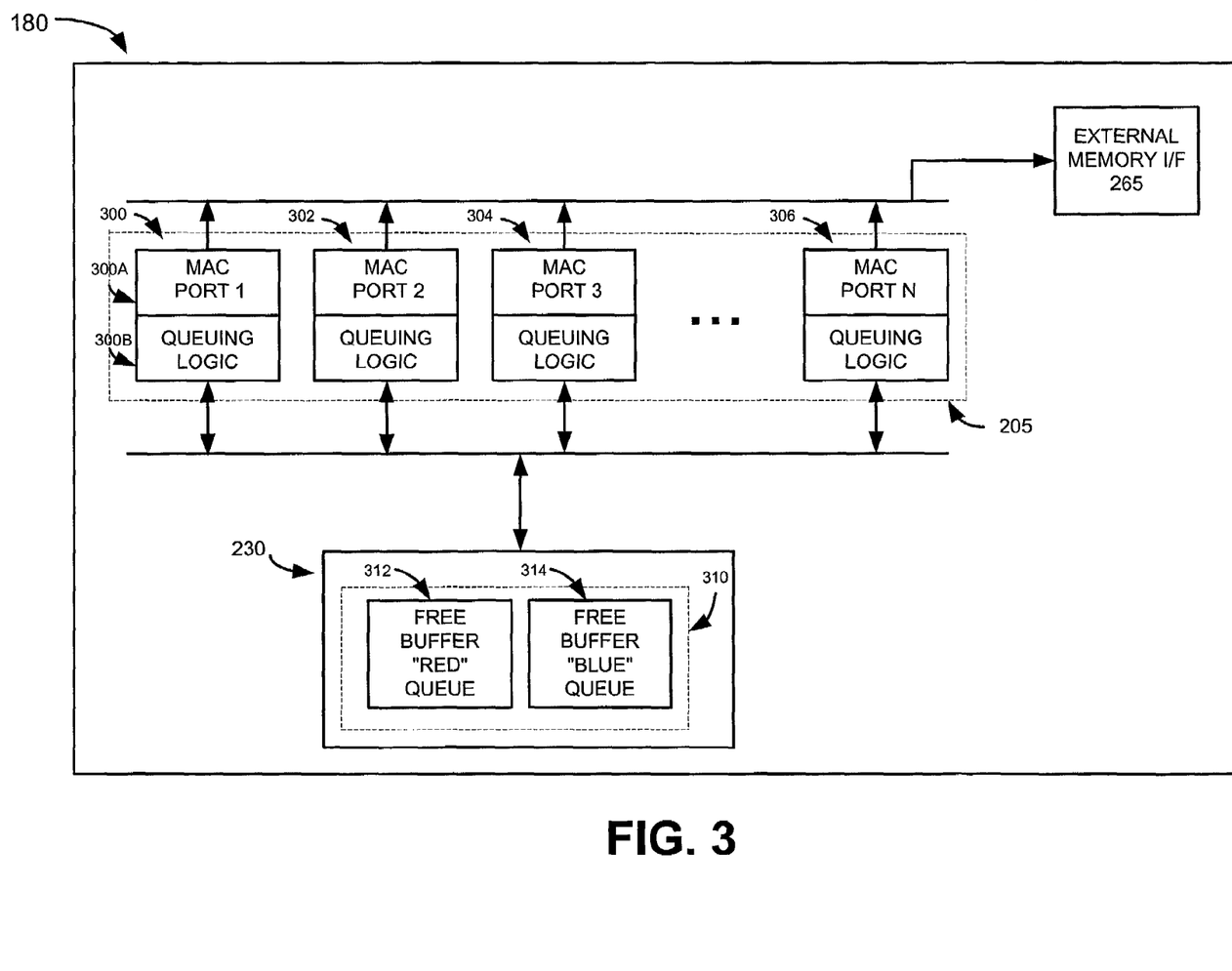
FIG. 3 is an exemplary detailed block diagram of a portion of the multiport switch of FIG. 1, consistent with an implementation of the present invention.

FIG. 3 illustrates a portion of multiport switch 180, consistent with an exemplary implementation of the present invention, in which priority-based flow control may be performed. Referring to FIG. 3, multiport switch 180 includes receiver 205, buffer management logic 230 and external memory interface 265.

The receiver 205 includes MAC modules labeled 300, 302, 304 and 306 corresponding to ports 1 through N, respectively. Each MAC module may include a receive FIFO buffer and queuing logic. For example, referring to FIG. 3, MAC module 300 may include a receive FIFO buffer, labeled 300A, and queuing logic 300B. The other MAC modules may similarly include receive FIFO buffers and queuing logic.

The buffer management logic 230 includes a free buffer queue 310. The free buffer queue 310 stores frame pointers that identify locations in external memory 170 that are available to store data frames. The free buffer queue 310, consistent with an exemplary implementation of the present invention, may be divided into one or more queues corresponding to different priorities. For example, referring to FIG. 3, the free buffer queue 310 may include a "red" queue 312 and a "blue" queue 314. The red queue 312 may correspond to frames having a "high" priority and the blue queue 314 may correspond to frames having a "low" priority. In other implementations of the present invention, the free buffer queue 310 may be divided into three or more queues corresponding to three or more priority levels. In addition, the free buffer queue 310 is illustrated as including separate queues 312 and 314. It should be understood that the free buffer queue 310 may be a single memory with certain addresses being designated as being associated with the red queue and the other addresses as being associated with the blue queue.

In any event, the free buffer queue 310 reserves frame pointers according to a priority. The particular number of frame pointers in each particular queue may be set based on the user requirements and may also be programmable by the user. That is, the user may change the number of frame pointers in each queue, via host interface 260, for example, based on network conditions and user requirements.

The queuing logic from a MAC module accesses the free buffer queue 310 when a data frame is received to determine whether an admission control operation should be performed with respect to the received data frame, as described in more detail below. The external memory interface 265, as described previously, receives data frame information from the receive FIFO buffers and transfers the data frame information to external memory 170 (FIG. 1).

In an exemplary implementation of the present invention, the multiport switch 180 categorizes data frames as having either a high priority or a low priority. A high priority frame may include a frame that requires lower access latency, such as a frame destined for a management device or a frame for a multimedia application. A low priority frame may include any other frame. In alternative implementations, the number of priorities associated with the data frames may be greater than two. For example, the multiport switch 180 may identify frames having one of three levels of priority, such as low, medium and high. In this scenario, the free buffer queue 310 may include three queues corresponding to each of the three priority levels.

In addition, in some implementations of the present invention, the multiport switch 180 may receive data frames having a priority indication. For example, an Ethernet frame may include a three-bit field representing one of eight levels of priority. In this case, priority mapping logic on multiport switch 180 may map the received priority information to a corresponding priority level supported by the multiport switch 180. For example, the eight levels of priority may be mapped to either high or low priority on the multiport switch 180. Alternatively, the eight levels of priority associated with received data frames may be mapped to three or more levels of priority on the multiport switch 180.

Figure 4:
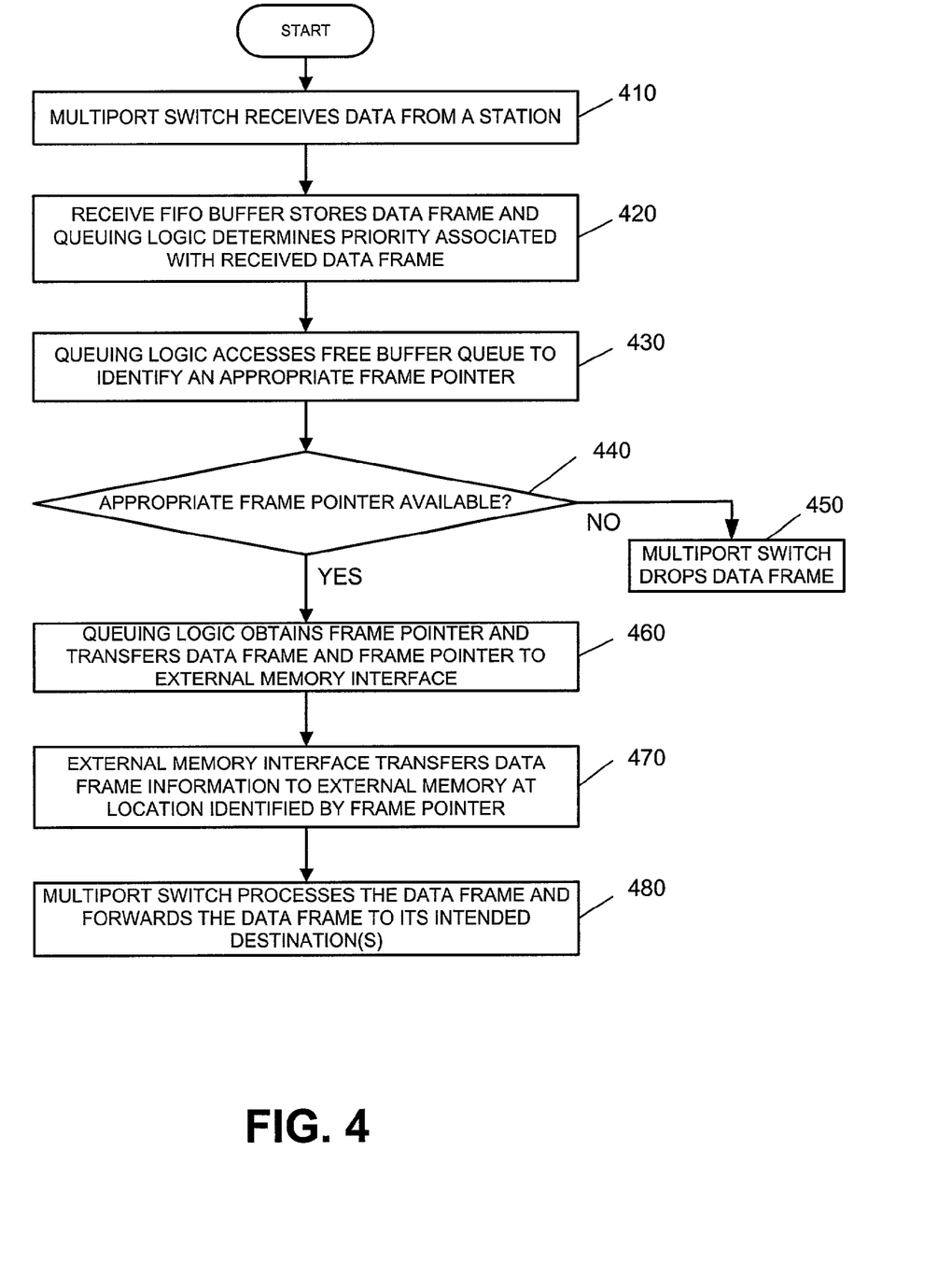
FIG. 4 is a flow diagram illustrating processing performed by the multiport switch of FIG. 1, according to an exemplary implementation consistent with the present invention.

FIG. 4 illustrates exemplary processing by multiport switch 180 in an implementation consistent with the present invention. Processing may begin upon start-up of network 100 (FIG. 1). Assume that a network station 110 transmits a data frame and multiport switch 180 receives the data frame [step 410]. For example, assume that MAC module 300 receives a data frame. In this case, receive FIFO buffer 300A stores the data frame and queuing logic 300B determines the priority associated with the received data frame [step 420]. As described previously, the queuing logic 300B may identify the priority based on the type of frame or the destination of the frame. For example, a frame for a multimedia application or a frame destined for a management device may be designated as a "high" priority frame. Alternatively, the queuing logic 300B may identify the priority based on any other criteria, such as the particular user's requirements. In another alternative, the queuing logic 300B may identify the priority based on priority information transmitted with the data frame, as described previously. In this situation, the queuing logic 300B may map the received priority information to a corresponding priority level supported by the multiport switch 180.

In any event, after identifying the priority associated with the data frame, queuing logic 300B accesses the free buffer queue 310 to identify an appropriate frame pointer that is associated with the priority of the received data frame [step 430]. For example, assume that queuing logic 300B determines that the received data frame is a "high" priority frame. Further assume that the red queue 312 is associated with high priority frames. In this situation, the queuing logic 300B determines whether the red queue 312 contains any available frame pointers [step 440]. If no frame pointer is available in the red queue 312, the queuing logic 300B drops the data frame [step 450]. That is, the queuing logic 300B does not forward the data frame to external memory 170 and the multiport switch 180 stops processing associated with forwarding that particular data frame. This means that the data frame will not be forwarded to its intended destination.

If a frame pointer is available in the red queue 312, the queuing logic 300B transfers the data frame to external memory interface 265 along with the frame pointer information [step 460]. The external memory interface 265 then transfers the data frame to the location in external memory 170 identified by the frame pointer [step 470]. The multiport switch 180 then processes the data frame to generate frame forwarding information, retrieves the data frame from external memory 170 and forwards the data frame to its intended destination(s) [step 480].

The processing described above uses the example of a high priority data frame being received by the multiport switch 180. Similar processing occurs for a low priority data frame. That is, the queuing logic checks the appropriate queue in the free buffer queue 310 to determine whether to drop the data frame. For a low priority frame, the queuing logic checks the free buffer blue queue 314 to determine whether a frame pointer is available.

In this manner, when a congestion condition occurs with regard to data frames of a certain priority, an admission control procedure ensures that data frames of another priority are not affected. For example, in situations where low priority data traffic is heavy, the low priority data traffic will not affect the multiport switch's 180 ability to process higher priority data frames or vice versa. In other words, data traffic of each priority may be allotted a certain number of frame pointers so that data traffic of one priority will not affect the ability of multiport switch 180 to process data traffic of another priority.

Described has been an apparatus and method for providing admission control in a network device. One advantage of the present invention is that the multiport switch 180 can selectively drop data frames having a certain priority. This prevents data traffic of one priority from occupying too much of the multiport switch's 180 resources. Another advantage of the present invention is that higher priority data frames may not be affected by data traffic of lower priorities. A further advantage of the invention is that the number of frame pointers reserved for each of the priority levels supported by the multiport switch 180 may be programmed by the user based on the user's particular requirements. This allows the user maximum flexibility in allocating the total number of frame pointers and reserving bandwidth within the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described mainly in relation to a free buffer queue that includes high and low priority queues. The present invention may also be used in situations where more than two levels of frame priority may exist. In this case, the free buffer queue 310 may be divided into a number of queues corresponding to the levels of priority supported by the multiport switch 180.

What is claimed is:

1. A network device configured to control communication of data frames between stations, comprising:
   a plurality of receive ports configured to receive data frames from the stations;
   data frame processing logic configured to:
      determine a priority associated with a received data frame, and
      determine whether a location in an external memory is available for storing the data frame, based on the priority of the received data frame, and
   at least one memory configured to store address information corresponding to locations in the external memory, the at least one memory including a number of portions corresponding to priorities associated with data frames received by the network device.

2. The network device of claim 1, wherein the data frame processing logic is further configured to:
   drop the data frame when a location in the external memory is not available.

3. The network device of claim 1, wherein the data frame processing logic is further configured to:
   transfer the data frame to the external memory when a location in the external memory is available.

4. The network device of claim 1, wherein when determining whether a location in the external memory is available, the data frame processing logic is configured to:
   access the at least one memory, and
   determine whether an address in a first one of the portions corresponding to the priority of the data frame is available.

5. The network device of claim 1, wherein the at least one memory comprises:
   a first memory associated with high priority data frames, and
   a second memory associated with data frames having normal or low priority.

6. The network device of claim 1, wherein the at least one memory is configured to store address pointers corresponding to locations in the external memory that are available for storing received data frames, the number of address pointers in each of the portions being programmable.

7. In a network device that controls communication of data frames between stations, a method comprising:
   receiving data frames from the stations;
   determining a priority associated with a received data frame; and
   determining, based on the priority of the received data frame, whether a location in an external memory is available for storing the data frame, wherein the determining whether a location in the external memory is available includes:
      accessing a memory on the network device, the memory including a number of queues corresponding to priorities associated with data frames received by the network device, and
      determining whether an address in a first one of the queues corresponding to the priority of the data frame is available.

8. The method of claim 7, further comprising:
   dropping the data frame when a location in the external memory is not available.

9. The method of claim 8, wherein the dropping a data frame includes:
   discarding the data frame and not forwarding the data frame to its intended destination.

10. The method of claim 7, further comprising:
    transferring the data frame to the external memory when a location in the external memory is available.

11. The method of claim 7, wherein when the priority of the received data frame is high, the determining whether a location in the external memory is available includes:
    accessing a first queue associated with high priority data frames, and
    determining whether an address in the first queue is available.

12. The method of claim 7, wherein the determining a priority associated with the received data frame includes:
    mapping a priority indicator received with the data frame to one of a number of priority levels supported by the network device.

13. A network device configured to control communication of data frames between stations comprising:
    a plurality of receive ports configured to receive data frames from the stations;
    at least one queue configured to store pointers corresponding to locations in an external memory, the at least one queue including a number of portions corresponding to priorities associated with data frames received by the network device; and
    processing logic configured to:
       determine a priority associated with a received data frame,
       access one of the portions of the least one queue based on the priority of the data frame, and
       determine whether a pointer is available in said accessed one of the portions.

14. The network device of claim 13, wherein the at least one queue comprises:
    a first queue associated with high priority data frames, the first queue being configured to store pointers corresponding to addresses in the external memory, and
    a second queue associated with data frames having at least one of normal or low priority, the second queue being configured to store pointers corresponding to addresses in the external memory; and
    wherein the processing logic is further configured to:
    obtain a first pointer when a pointer is available in one of the first or second queues corresponding to the priority of the received frame, and
    transfer the data frame to the external memory at an address identified by the first pointer.

15. The network device of claim 13, wherein the processing logic is further configured to:

drop the data frame when a pointer is not available in one of the portions corresponding to the priority of the received data frame.

16. The network device of claim 15, wherein the network device is configured to stop processing the dropped data frame and not forward the dropped data frame to its intended destination.

17. The network device of claim 13, wherein when determining a priority associated with the received data frame, the processing logic is configured to:

map a priority indicator received with the data frame to one of a number of priority levels supported by the network device.

18. The network device of claim 13, wherein the at least one queue comprises one queue and the number of portions correspond to logical portions of the one queue, wherein each logical portion corresponds to a priority associated with data frames received by the network device.

19. The network device of claim 13, wherein each logical portion comprises a programmable number of pointers.

* * * * *